(12) United States Patent
Nakamura

(10) Patent No.: US 6,449,411 B1
(45) Date of Patent: Sep. 10, 2002

(54) OPTICAL WAVELENGTH TUNABLE FILTER

(75) Inventor: Keiji Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/645,496

(22) Filed: Aug. 25, 2000

(30) Foreign Application Priority Data

Aug. 26, 1999 (JP) .......................................... 11-239505

(51) Int. Cl.[7] .............................. G02B 6/26; G02B 6/42
(52) U.S. Cl. .............................. 385/40; 385/41; 385/8; 385/10; 385/24; 359/124; 359/130
(58) Field of Search .......................... 385/10, 28, 29, 385/44, 45, 130, 16, 17, 18, 19, 20, 21, 22, 23, 24, 31, 37, 39, 40, 8, 2, 1, 4, 9, 14, 15, 27, 129, 131, 132, 7; 359/115, 124, 130, 138

(56) References Cited

U.S. PATENT DOCUMENTS

| | | | | |
|---|---|---|---|---|
| 5,438,637 A | * | 8/1995 | Nilsson | 385/10 |
| 5,581,642 A | * | 12/1996 | Deacon et al. | 385/15 |
| 5,781,669 A | * | 7/1998 | Schmid et al. | 385/7 |
| 6,091,870 A | * | 7/2000 | Eldada | 385/37 |
| 6,097,861 A | * | 8/2000 | Kim | 385/27 |
| 6,141,465 A | * | 10/2000 | Bischel | 385/4 |
| 6,226,426 B1 | * | 5/2001 | Mange | 385/24 |
| 6,226,428 B1 | * | 5/2001 | Saito | 385/42 |
| 6,256,428 B1 | * | 7/2001 | Norwood | 385/17 |

FOREIGN PATENT DOCUMENTS

JP 4-168416 6/1992

* cited by examiner

*Primary Examiner*—Brian Healy
*Assistant Examiner*—Kevin S Wood
(74) *Attorney, Agent, or Firm*—McGinn & Gibb, PLLC

(57) ABSTRACT

An optical wavelength tunable filter includes an optical waveguide having a first branched optical waveguide and a second branched optical waveguide merging into one piece of the optical waveguide through which optical wavelength multiplexed signals, each having a different wavelength component being incident from an end face of the first branched optical waveguide, are propagated. A comb-type electrode (or a plurality of comb-type electrodes each corresponding to each of the different wavelength-components) is mounted vertically to apropagating direction of the optical wavelength multiplexed signals leaving a specified space apart from the optical waveguide formed by a merger of the branched first branched optical waveguide with the second branched optical waveguide. A voltage applying device applies a predetermined voltage to each of the comb-type electrodes.

17 Claims, 4 Drawing Sheets

FIG.5 *(PRIOR ART)*
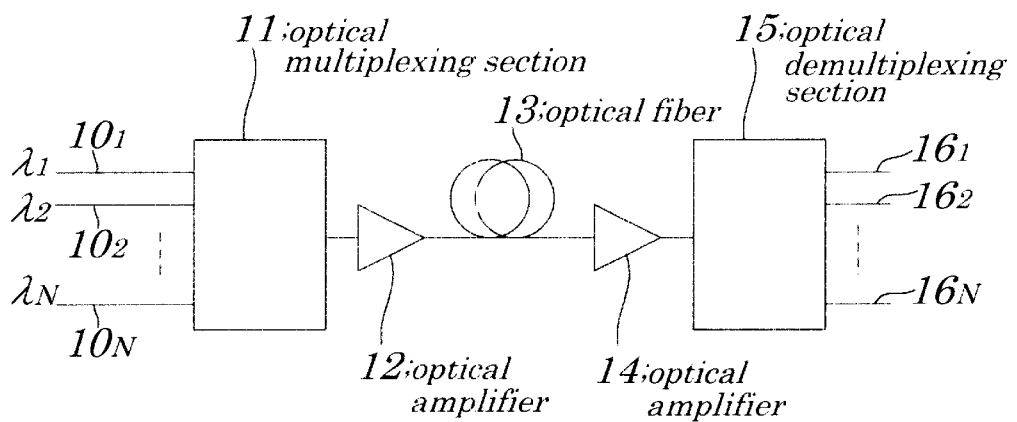
FIG.6 *(PRIOR ART)*
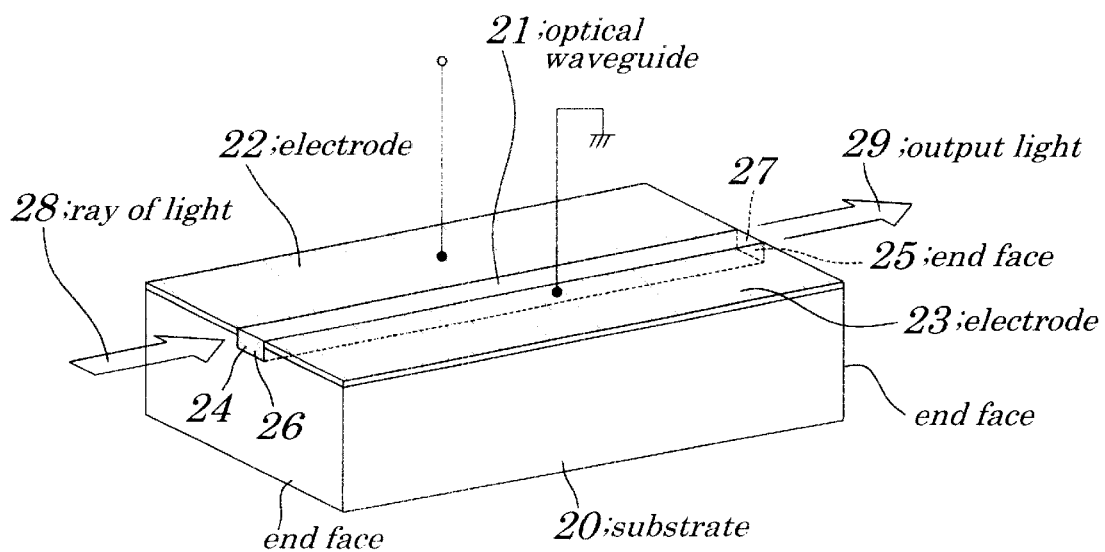

OPTICAL WAVELENGTH TUNABLE FILTER

BACKGROUND OF THE INVENTION

1. Field of the Invention

The present invention relates to an optical wavelength tunable filter and more particularly to the optical wavelength tunable filter which can be suitably used for an optical wavelength multiplexing transmission system.

2. Description of the Related Art

In recent years, a transmission capacity of one communication line increases as types of information communications are diversified. To meet a need for such increased transmission capacity of the communication line, a variety of technologies have been developed. Among them, a dense wavelength division multiplexing (DWDM) transmission technology capable of transmitting a plurality of lightwave signals by only one optical fiber and/or an optical cross-connect (OXC) technology in particular have received widespread attention.

FIG. 5 is a schematic block diagram showing configurations of a conventional communication system employing the DWDM transmission technology. In this communication system, sending lightwave signals $10_1$ to $10_N$ each having a different wavelength component $\lambda_1$ to $\lambda_N$ input on a sender side are multiplexed by an optical multiplexing section 11. The optical multiplexing section 11 is made up of an array-waveguide grating (AWG) serving as a planar lightwave circuit (PLC). A lightwave signal multiplexed by the optical multiplexing section 11 is amplified by an optical amplifier 12 and is sent out to an optical fiber 13. On a receiver side, the lightwave signal received through the optical fiber 13 is amplified by an optical amplifier 14 and is then input to an optical demultiplexing section 15. The optical demultiplexing section 15 is made up of the AWG as in the optical multiplexing section 11. Generally, by inverting the AWG from its input side to its output side or vice versa, it can be used not only as an optical multiplexer but also as an optical demultiplexer. An amplified lightwave signal input into the optical demultiplexing section 15 is output as received lightwave signals $16_1$ to $16_N$ each having a different wavelength component $\lambda_1$ to $\lambda_N$. Though the AWG used on the receiver side in the communication system employing the DWDM transmission technology is able to extract light having a specified wavelength component with high accuracy, it is expensive. Moreover, the AWG has a problem in that an easy changing of the wavelength component to be extracted is impossible. To solve this problem, in some cases, an optical wavelength tunable filter capable of extracting light having a specified wavelength from a plurality of rays of light branched by an optical branching device is used as the optical demultiplexer, instead of the AWG. Various types of optical wavelength tunable filters are proposed and one of them is disclosed in Japanese Patent Application Laid-open No. Hei4-168416 under "An optical wavelength tunable filter".

FIG. 6 is a perspective view showing configurations of the optical wavelength tunable filter employed in the technology disclosed in Japanese Patent Application Laid-open No. Hei4-168416. In the optical wavelength tunable filter disclosed above, an optical waveguide 21 is formed on a substrate 20 having an electro-optic effect. Electrode 22 and electrode 23 are formed by evaporation on both sides of the optical waveguide 21 on an upper face of the substrate 20. The electrode 22 is connected to a terminal of a supply power voltage V. The electrode 23 is grounded. On each of end faces of the optical waveguide 21 are mounted reflecting film 26 and reflecting film 27. The optical wavelength tunable filter having configurations as described above has a Fabry-Perot resonance characteristic upon which a specified wavelength component causing a relative transmittance to be "1" is periodically dependent in a state where the reflecting film 26 and reflecting film 27 are mounted at both end face 24 and end face 25 of the optical waveguide 21 and when a voltage is applied between the electrode 22 and electrode 23. Therefore, when a plurality rays of light 28 each having a different wavelength component out of $\lambda_1$ to $\lambda_N$, branched by the optical branching device mounted in the optical demultiplexing section 15 shown in FIG. 5, are input from the end face 24 of the optical wavelength tunable filter shown in FIG. 6, only lightwave signal having the wavelength component conforming to the specified wavelength component that causes the relative transmittance to be "1" is output from the end face 25 as output light 29. Moreover, by changing the voltage V to be applied between the electrode 22 and electrode 23, a refractive index of the optical waveguide is changed by the electro-optic effect. The wavelength component of the output light 29 to be emitted can be changed as well.

Thus, by using the optical wavelength tunable filter described as above for a plurality rays of light each having a different wavelength component out of $\lambda_1$ to $\lambda_N$, branched by the optical branching device mounted in the optical demultiplexing section 15, only lightwave signal having a desired wavelength component can be extracted at low costs.

However, the conventional optical wavelength tunable filter has a problem in that it requires a substrate having electro-optic effects as a special material, thus making it costly when compared with one fabricated using a silica based material with properties being equivalent to optical fiber. Moreover, another problem is that the conventional optical wavelength tunable filter can be made less integrated when compared with one fabricated using the silica based material.

Thus, a demand is increasing for the optical wavelength tunable filter which can be formed on a substrate made of the silica based material allowing low-cost production and high integration.

SUMMARY OF THE INVENTION

In view of the above, it is an object of the present invention to provide an optical wavelength tunable filter which can be highly integrated and fabricated at low costs.

According to a first aspect of the present invention, there is provided an optical wavelength tunable filter including:

an optical waveguide having a first branched optical waveguide and a second branched optical waveguide merging into one piece of the optical waveguide through which optical wavelength multiplexed signals each having a different wavelength component being incident from an end face of the first branched optical waveguide are propagated;

one comb-type electrode or a plurality of comb-type electrodes each corresponding to each of the different wavelength components, mounted vertically to a propagating direction of the optical wavelength multiplexed signals leaving a specified space apart from the optical waveguide formed by the merger of the first branched optical waveguide with the second branched optical waveguide; and a voltage applying circuit to apply a predetermined voltage to each of the comb-type electrodes.

By configuring as above, since a refractive index of the optical waveguide is changed by an electric field produced by the voltage applied to the comb-type electrode and since only light having a diffraction wavelength contained in the optical wavelength multiplexed light can be reflected, the light having any wavelength component can be extracted by simplified configurations of the optical wavelength tunable filter as provided by the present invention.

According to a second aspect of the present invention, there is provided an optical wavelength tunable filter including:

an optical waveguide formed in parallel to an upper face of a substrate made of a silica based material having a first branched optical waveguide and second optical branched waveguide merging into one, through which optical wavelength multiplexed signals each having a different wavelength component being incident from the first branched optical waveguide are propagated;

one comb-type electrode or a plurality of comb-type electrodes each corresponding to each of the different wavelength components, mounted on the substrate vertically to a propagating direction of the optical wavelength multiplexed signals leaving a specified space apart from the optical waveguide formed by the merger of the first branched optical waveguide with the second branched optical waveguide;

an antireflection terminal mounted facing an end face of the optical waveguide formed by the merger of the first branched optical waveguide with the second branched optical waveguide; and a voltage applying circuit to apply a predetermined voltage to each of the comb-type electrodes.

By configuring as above, since the silica based material with properties being equivalent to an optical fiber is used, the optical wavelength tunable filter can be provided which is excellent in matching in terms of properties of materials used and which allows low-cost extraction of light having any wavelength component and easy integration. Moreover, lightwave signals having an unwanted wavelength component can be terminated with no reflection.

According to a third aspect of the present invention, there is provided an optical wavelength tunable filter including:

one first optical filter or a plurality of first optical filters each having an optical waveguide formed in parallel to an upper face of a substrate made of a silica based material having a first branched optical waveguide and a second branched optical waveguide merging into one, through which optical wavelength multiplexed signals each having a different wavelength component being incident from the first branched optical waveguide are propagated and one comb-type electrode or a plurality of comb-type electrodes each corresponding to each of the different wavelength components, mounted on the substrate vertically to a propagating direction of the optical wavelength multiplexed signals leaving a specified space apart from the optical waveguide formed by the merger of the first branched optical waveguide with the second branched optical waveguide, wherein light emitted from the optical waveguide formed by the merger of the first branched optical waveguide with the second branched optical waveguide disposed in a preceding stage is incident into the first branched optical waveguide disposed in a subsequent stage; and a second optical filter having an optical waveguide through which optical wavelength multiplexed signals each having a different wavelength component being incident from a third branched optical waveguide, which is merged with a fourth branched optical waveguide into one optical waveguide, to which light emitted from an end face of the optical waveguide formed in parallel to the upper face of the substrate by the merger of the first branched optical waveguide with the second branched optical waveguide disposed in a final stage of the first optical filter is incident, are propagated, an antireflection terminal mounted facing an end face of the optical waveguide formed by the merger of the third branched optical waveguide with the fourth branched optical waveguide, one comb-type electrode or a plurality of comb-type electrodes each corresponding to each of the different wavelength components, mounted on the substrate vertically to a propagating direction of the optical wavelength multiplexed signals leaving a specified space apart from the optical waveguide formed by the merger of the third optical waveguide with the fourth optical waveguide and a voltage applying circuit to apply a predetermined voltage to each of the comb-type electrodes.

By configuring as above, a plurality of lightwave signals each having the specified wavelength component can be extracted simultaneously from the first branched optical waveguide of the first filter and from the fourth branched optical waveguide of the second optical filter, from the same multiplexed input light.

In the foregoing, a preferable mode is one wherein a feedback light intercepting means is mounted to the end face of the branched optical waveguide, out of the first branched optical waveguide and second branched optical waveguide, into which the optical wavelength multiplexed signals each having a different wavelength component are input.

By configuring as above, degradation of a signal to noise ratio can be avoided.

Also, a preferable mode is one wherein at least one factor out of a width of each comb-type electrode, an amount of clearance between comb-type electrodes and number of comb-type electrodes is determined based on diffraction wavelength and wherein refractive index of the optical waveguide is changed, in a manner as if changed by a diffraction grating, by an electric field generated by the voltage applied by the voltage applying circuit used to apply the voltage corresponding to each wavelength component.

By configuring as above, the lightwave signals having the corresponding diffraction wavelength can be obtained by being reflected by the electrode to which the predetermined voltage is applied by the voltage applying circuit. Moreover, both low costs in production of the filter and highly precise light extraction can be achieved at a same time.

BRIEF DESCRIPTION OF THE DRAWINGS

The above and other objects, advantages and features of the present invention will be more apparent from the following description taken in conjunction with the accompanying drawings in which:

FIG. 5 is a schematic block diagram showing configurations of a conventional communication system employing a DWDM transmission technology; and FIG. 6 is a perspective view showing configurations of an optical wavelength tunable filter employed in technology disclosed in Japanese Patent Application Laid-open No. Hei4-168416.

DETAILED DESCRIPTION OF THE PREFERRED EMBODIMENTS

Best modes of carrying out the present invention will be described in further detail using various embodiments with reference to the accompanying drawings.

First Embodiment

Figure 1:
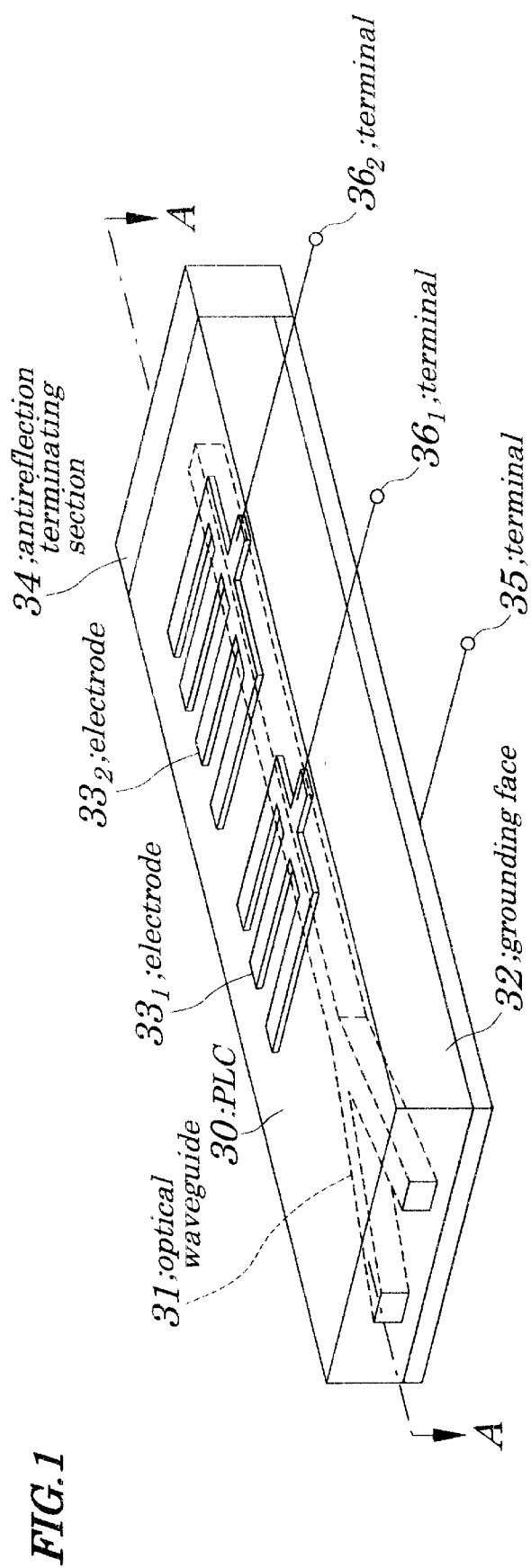
FIG. 1 is a perspective view showing configurations of an optical wavelength tunable filter according to a first embodiment of the present invention.

FIG. 1 is a perspective view showing configurations of an optical wavelength tunable filter according to a first embodiment of the present invention. The optical wavelength tunable filter of the first embodiment is formed on a planar lightwave circuit (PLC) 30 made of silica based material having properties being equivalent to an optical fiber. The optical wavelength tunable filter of the first embodiment is so configured that an optical waveguide 31 made of a cladding made from silica glass ($SiO_2$) formed on a silicon (Si) substrate (not shown) and of a core whose refractive index has been increased by doping the silica glass ($SiO_2$) with a small amount of a doping agent such as germanium (Ge), is formed in parallel to an upper face of the PLC 30. Two optical waveguides extending from two end faces of the PLC 30, both of which constitute a branched Y-shaped portion of the optical waveguide 31, merge in partway into one piece of the optical waveguide 31. Through this optical waveguide 31 are propagated a plurality of optical wavelength multiplexed lightwave signals each having a different wavelength component out of components $\lambda_1$ to $\lambda_N$.

As shown in FIG. 1, a grounding face 32 made of a metal thin film made of aluminum (Al) is evaporated all over the lower face of the PLC 30. On an upper surface of the PLC 30, grating-structured electrode 33, and 332 made of metal thin films made of aluminum (Al) are mounted in a direction intersecting vertically to a direction in which the lightwave signal propagates passing through an intersected portion where the two optical waveguides constituting the Y-shaped portion of the optical waveguide 31 merge. Though, in FIG. 1 of the first embodiment, only two grating-structured electrode $33_1$ and electrode $33_2$ are mounted. the electrodes corresponding to the number of lightwave signals each having a specified wavelength component to be extracted may be mounted as well.

The grating-structured electrode $33_1$ and electrode $33_2$ are respectively comb-type electrodes as a whole which have respectively pluralities of tooth electrodes. Number and width of the tooth electrodes to be mounted and distances between the tooth electrodes differ depending on the wavelength component to be extracted. Predetermined voltages $V_1$ to $V_3$ corresponding to each of the wavelength components to be extracted are applied to each of the electrodes. By mounting such grating-structured electrode $33_1$ and electrode $33_2$ as described above on the optical waveguide 31, at the intersected portion positioned under the grating-structured electrode $33_1$ and electrode $33_2$ mounted on the optical waveguide 31, a refractive index of the optical waveguide 31 is changed, in a manner as if changed by a diffraction grating, by an electric field generated by voltage applied to the electrode. Therefore, the lightwave signal having the wavelength component corresponding to a diffraction wavelength is reflected.

To an other end face of the optical waveguide 31 formed by a merger of the two branched waveguides constituting the Y-shaped portion is mounted an antireflection terminating section 34. The antireflection terminating section 34 is adapted to absorb the lightwave signal output from the end face of the optical waveguide 31 formed by the merger. In the embodiment shown in FIG. 1, the antireflection terminating section 34 is so mounted as to contact the PLC 30. However, the antireflection terminating section 34 may be provided so that it is embedded within the PLC 30. The end face of the optical waveguide 31 may be cut, in the PLC 30, for example, toward a slanting direction to the propagating direction of the lightwave signal so that a cut end face can structually absorb reflected light. Any structure is, however, acceptable unless the lightwave signal propagating through the optical waveguide 31 is not reflected.

The grounding face 32 formed under a lower face of the PLC 30 and grating-structured electrode $33_1$ and electrode $33_2$ are electrically connected to their terminals 35, $36_1$ and $36_2$ respectively.

Figure 2:
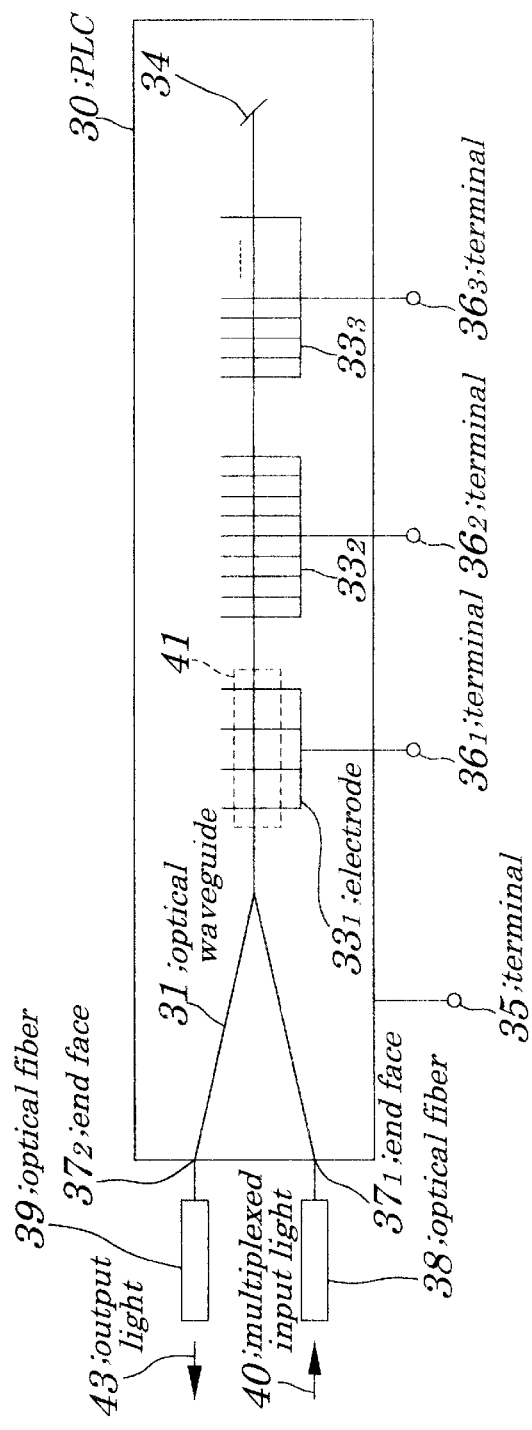
FIG. 2 is a plan view showing configurations of the optical wavelength tunable filter according to the first embodiment of the present invention.

FIG. 2 is a plan view showing configurations of the optical wavelength tunable filter according to the first embodiment. In FIG. 2, same reference numbers are assigned to corresponding parts of the optical wavelength tunable filter as in FIG. 1 and their descriptions are omitted accordingly. As shown in FIG. 2, the end face of the optical waveguide 31 is cut, within the PLC 30, toward a slanting direction to the propagating direction of the lighwave signal so that the cut end face can structually absorb the reflected light, which serves as the antireflection terminating section 34, and the grating-structured electrodes 331 to 333 each corresponding to each of the wavelength components $\lambda_1$ to $\lambda_3$ are mounted. To an end face $37_1$ of one optical waveguide forming the Y-shaped portion of the optical waveguide 31 mounted on the PLC 30 is connected an optical fiber 38 serving as an input port, while an optical fiber 39 is connected to an end face $37_2$ of the other optical waveguide constituting the Y-shaped portion of the optical waveguide 31. The number and width of the tooth electrodes constituting the grating-structured electrodes $33_1$ ($33_2$, $33_3$) and the amount of distances between the tooth electrodes are set so as to be matched to each of the wavelength components $\lambda_1$ to $\lambda_3$.Multiplexed input light 40 obtained by optical wavelength multiplexed signals having wavelength components $\lambda_1$ to $\lambda_3$ is input through the optical fiber 38. In the embodiment, it is assumed that predetermined voltage $V_1$ corresponding to the wavelength component $\lambda_1$ is applied only between the terminal $36_1$ and terminal 35 connected to ground.

Figure 3:
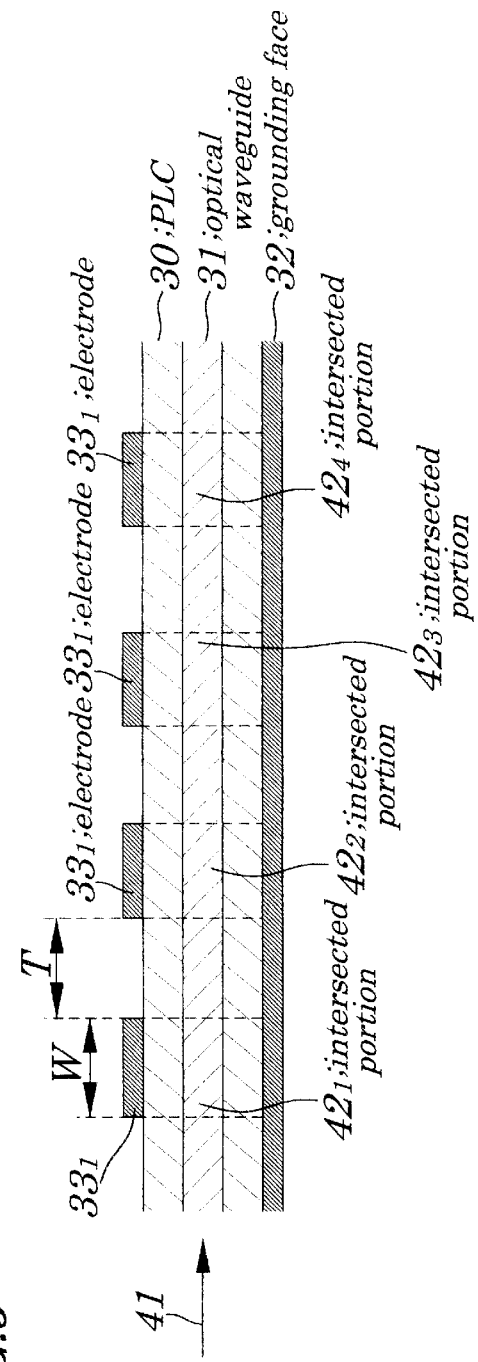
FIG. 3 is a cross-sectional view of the optical wavelength tunable filter of FIG. 1 taken along a line A—A.

FIG. 3 is a cross-sectional view of the optical wavelength tunable filter, which is also a cross-sectional view of the one encircled by dotted lines (labeled 41) shown in its plan view in FIG. 2, of FIG. 1 taken along line A—A. In FIG. 3, same reference numbers are assigned to corresponding parts of the optical wavelength tunable filter as in FIG. 1 and their descriptions are omitted accordingly. Since predetermined voltage corresponding to the wavelength component $\lambda_1$ is applied between the terminal 361 and terminal 35 connected to ground, an electric field is generated which causes refractive index of the optical waveguide 31 to be changed at intersected portions $42_1$ to $42_4$ constituting the lower part of each of the grating-structured electrodes $33_1$. The refractive index of the optical waveguide 31 is changed depending on width W of the tooth electrode which constitute the grating-structured electrodes $33_1$ corresponding to the wavelength component $\lambda_1$, the amount of distances between the tooth electrodes in manner as if changed by the diffraction grating.

Therefore, only the lightwave signal having the wavelength component $\lambda_1$ contained in the multiplexed input light 40 propagating through the optical waveguide 31 is reflected. That is, as shown in FIG. 2, the lightwave signal having the wavelength component $\lambda_1$ contained in the multiplexed input light 40 being incident from the end face 37, through the optical fiber 38 is reflected by changes in the refractive index of the optical waveguide 31, which are made as if by the diffraction grating, by the electric field generated by the specified voltage applied to the electrode $33_1$. The multiplexed light having the remaining wavelength components $\lambda_2$ and $\lambda_3$ travels in a straight line. Since predetermined voltages $V_2$ and $V_3$ are not applied between the terminal $36_2$ and the terminal 35 connected to ground and between the terminal $36_3$ and the terminal 35, the multiplexed light reaches the antireflection terminating section 34 where it is terminated with no reflection.

The lightwave signal having the wavelength component $\lambda_1$, which has been reflected by changes in the refractive index of the optical waveguide 31, which are made as if changed by the diffraction grating, by the electric field generated by the voltage applied to the electrode $33_1$, travels in a straight line toward end faces $37_1$ and $37_2$. To the end face $37_1$ is connected the optical fiber 39 through which the lightwave signal having the wavelength component $\lambda_1$ is output as output light 43. Since the lightwave signal having the wavelength component $\lambda_1$, which has been reflected by changes in the refractive index of the optical waveguide 31, which are made as if by the diffraction grating, by the electric field generated by the voltage applied to the electrode $33_1$, is returned back to the end face $37_1$ as feedback light, an isolator or a circulator mounted to the end face $37_1$ is adapted to prevent feedback light being incident into the optical fiber 38, thus being able to avoid degradation of a signal to noise ratio.

A lightwave signal having a wavelength component $\lambda_2$ can be extracted in a same manner as above. That is, by applying the predetermined voltage $V_2$ between the terminal $36_2$ and terminal 35, the lightwave signal having the wavelength component $\lambda_2$ is reflected by changes in the refractive index of the optical waveguide 31, which are made as if by the diffraction grating, by the electric field generated by the voltage applied to the electrode $33_2$ and is output as the output light 43. The multiplexed light having the remaining wavelength components $\lambda_1$ and $\lambda_2$ travels in a straight line and is terminated with no reflection. The extraction of the lightwave signal having a wavelength component $\lambda_3$ can be performed in a same manner as above.

Thus, according to the first embodiment, the optical wavelength tunable filter is so configured that the grating-structured electrode $33_1$ to electrode $33_3$ composed of the metal thin film each corresponding to each of the wavelength components $\lambda_1$ to $\lambda_3$ are mounted on the Y-shaped optical waveguide 31 formed on the PLC 30 and the predetermined voltages $V_1$ to $V_3$ are applied to the grating-structured electrode $33_1$ to electrode $33_3$, that is, when the multiplexed input light 40 is incident from the end face $37_1$ of the one optical waveguide constituting the Y-shaped portion of the optical waveguide 31 and predetermined voltage is applied to each of the electrodes each corresponding to each of the wavelength components, the refractive index of the optical waveguide 31 passing under the electrodes to which voltage is applied is changed, in the manner as if changed by the diffraction grating, by electric field generated by voltage applied to electrodes each corresponding to each wavelength component, causing the light having the corresponding wavelength component to be output from the end face $37_2$ of the other optical waveguide constituting the Y-shaped portion of the optical waveguide 31. Moreover, by using the silica based material having properties being equivalent to an optical fiber, the optical wavelength tunable filter can be provided which is excellent in matching in terms of properties of materials used and which allows low-cost extraction of light having any wavelength component and easy integration.

Second Embodiment

In a optical wavelength tunable filter of the first embodiment, electrodes each corresponding to each wavelength component are mounted vertically to a propagating direction of lightwave signals passing through a optical waveguide 31 mounted on a PLC 30. However, according to a second embodiment, a plurality of optical wavelength tunable filters are connected, which enable extraction of a plurality of the lightwave signals having specified wavelength components from same multiplexed input light.

Figure 4:
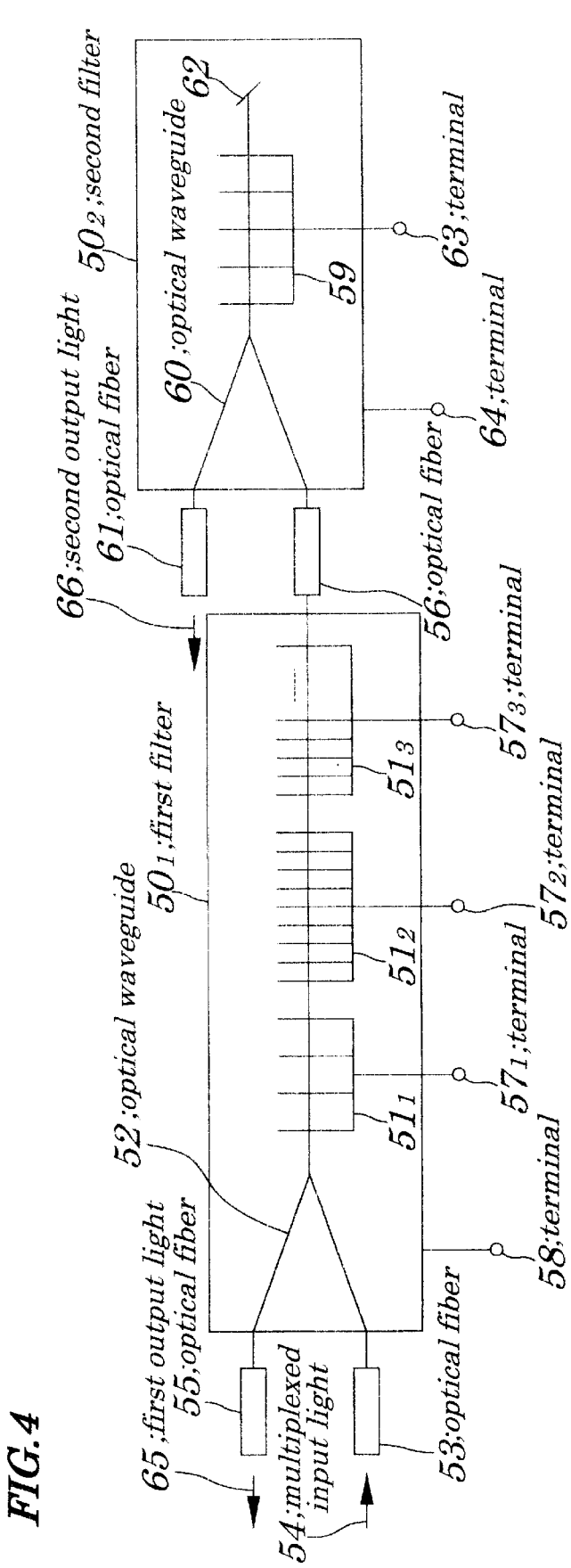
FIG. 4 is a top view showing configurations of an optical wavelength tunable filter according to a second embodiment.

FIG. 4 is a top view showing configurations of the optical wavelength tunable filter according to the second embodiment. As shown in FIG. 4, the optical wavelength tunable filter of the second embodiment has a first filter $50_1$ and a second filter $50_2$. Unlike in a case of the first embodiment, the first filter $50_1$ is not provided with an antireflection terminating section. Grating-structured electrodes $51_1$, $51_2$ and $51_3$ corresponding to wavelength components $\lambda_1$, $\lambda_2$ and $\lambda_3$ respectively are mounted. Multiplexed input light 54 having wavelength components $\lambda_1$ to $\lambda_4$ is input through an optical fiber 53 to an input end face of one optical waveguide constituting a Y-shaped optical waveguide 52 formed on the first filter $50_1$. To an output end face of an other optical waveguide constituting the Y-shaped portion of the optical waveguide 52 is connected an optical fiber 55. To an other end of the optical waveguide 52 is connected an optical fiber 56. Each of electrodes $51_1$ to $51_3$ is connected electrically to each of terminals $57_1$ to $57_3$ and each of predetermined voltages $V_1$, $V_2$ and $V_3$ is applied between a terminal 58 connected to ground and each of terminals $57_1$ to $57_3$. Configurations of the second filter $50_2$ are same as those described in the first embodiment shown in FIG. 2. A grating-structured electrode 59 adapted to correspond to the wavelength component $\lambda_4$ is mounted. To an end face of one optical waveguide constituting a Y-shaped portion of an optical waveguide 60 formed on the second filter $50_2$ through an optical fiber 56 is input output light fed from the end face of the other optical waveguide constituting the Y-shaped portion of the optical waveguide 52 of the first filter $50_1$. To an other end face of the Y-shaped portion of the optical waveguide 60 is connected an optical fiber 61. To an other end of the optical waveguide 60 is connected an antireflection terminating section 62. The electrode 59 is connected electrically to a terminal 63 and a predetermined voltage $V_4$ is applied between the terminal 63 and a terminal 64 connected to ground.

In the embodiment, it is presumed that the predetermined voltage $V_1$ is applied between the terminal $57_1$ and a terminal 58 in the first optical wavelength filter $50_1$. Moreover, it is also presumed that the predetermined voltage $V_4$ is applied between the terminal 63 and the terminal 64 in the second optical wavelength filter $50_2$. A lightwave signal having the wavelength component $\lambda_1$ contained in the multiplexed input light having wavelength components $\lambda_1$ to $\lambda_4$ entered through the optical fiber 53 is reflected. Lightwave signals having the remaining wavelength components $\lambda_2$ to $\lambda_4$ are input through the optical fiber 56 to one end face of the Y-shaped portion of the optical waveguide 60 formed on the second filter $50_2$. The lighwave signal having the wavelength component $\lambda_1$ reflected by the electrode $51_1$ is output through the optical fiber 55 as first output light 65. Only the lightwave signal having the wavelength component $\lambda_4$ contained in the multiplexed light being incident into the second filter $50_2$ is reflected by the electrode 59 and is output through the optical fiber 61 as second output light 66. The lightwave signals each having the wavelength components $\lambda_2$ or $\lambda_3$ which are not reflected by the electrode 59 travels in a straight line to the antireflection terminating section 62 where the lightwave signals are terminated with no reflection. To prevent feedback light from returning, an isolator is mounted at an end face, through which lightwave signals are input from outside, of the first filter $50_1$ and second filter $50_2$. In the second embodiment, two optical wavelength tunable filters are connected, however, three or more filters may be connected as well, in which case the antireflection terminating section 62 must be mounted at a filter in a final stage to terminate the lighwave signal with no reflection.

Thus, in the optical wavelength tunable filter of the second embodiment, by connecting a plurality of the optical wavelength tunable filters used in the first embodiment, by removing the antireflection terminating section except in the filter in the final stage, by using the output light from a previous filter is used as the input light for the filter in the next stage and by mounting the antireflection terminating section mounted only to the filter in the final stage to prevent the feedback light returning, it is made possible to simultaneously extract a plurality of lightwave signals each having a specified wavelength component from the multiplexed input light.

It is apparent that the present invention is not limited to the above embodiments but may be changed and modified without departing from the scope and spirit of the invention.

Finally, the present application claims the priority of Japanese Patent Application No. Hei11-239505 filed on Aug. 26, 1999, which is herein incorporated by reference.

What is claimed is:

1. An optical wavelength tunable filter comprising:
an optical waveguide having a first branched optical waveguide and second branched optical waveguide merging into one piece of said optical waveguide through which optical wavelength multiplexed signals, each having a different wavelength component being incident from an end face of said first branched optical waveguide, are propagated;
one comb-type electrode or a plurality of comb-type electrodes each corresponding to each of said different wavelength components, mounted vertically to a propagating direction of said optical wavelength multiplexed signals leaving a specified space apart from said optical waveguide formed by a merger of said branched first branched optical waveguide with said second branched optical waveguide;
an antireflection terminating means mounted facing an end face of said optical waveguide formed by the merger of said first branched optical waveguide with said second branched optical waveguide; and
a voltage applying means to apply a predetermined voltage to each of said comb-type electrodes.

2. An optical wavelength tunable filter comprising:
an optical waveguide formed in parallel to an upper face of a substrate made of a silica based material having a first branched optical waveguide and second branched optical waveguide merging into one, through which optical wavelength multiplexed signals each having a different wavelength component being incident from said first branched optical waveguide are propagated;
one comb-type electrode or a plurality of comb-type electrodes each corresponding to each of said different wavelength components, mounted on said substrate vertically to a propagating direction of said optical wavelength multiplexed signals leaving a specified space apart from said optical waveguide formed by a merger of said first branched optical waveguide with said second branched optical waveguide;
an antireflection terminating means mounted facing an end face of said optical waveguide formed by the merger of said first branched optical waveguide with said second branched optical waveguide; and
a voltage applying means to apply a predetermined voltage to each of said comb-type electrodes.

3. An optical wavelength tunable filter comprising:
one first optical filter or a plurality of first optical filters each having an optical waveguide formed in parallel to an upper face of a substrate made of a silica based material having a first branched optical waveguide and second branched optical waveguide and second branched optical branched waveguide merging into one, through which optical wavelength multiplexed signals each having a different wavelength component being incident from said first branched optical waveguide are propagated and one comb-type electrode or a plurality of comb-type electrodes each corresponding to said different wavelength component, mounted on said substrate vertically to a propagating direction of said optical wavelength multiplexed signals leaving a specified space apart from said optical waveguide formed by said merger of said first branched optical waveguide with said second branched optical waveguide, wherein light emitted from said optical waveguide formed by said merger of said first branched optical waveguide with said second branched optical waveguide disposed in a preceding stage is incident into said first branched optical waveguide disposed in a subsequent stage; and
a second optical filter having a branched optical waveguide through which optical wavelength multiplexed signals each having a different wavelength component being incident from a third branched optical waveguide are propagated, which is formed by a merger with a fourth branched optical waveguide into one optical waveguide, to which light emitted from an end face of said optical waveguide formed in parallel to said upper face of said substrate by said merger of said first branched optical waveguide with said second branched optical waveguide disposed in a final stage of said first optical filter is incident, an antireflection terminating means mounted facing an end face of said optical waveguide formed by said merger of said third branched optical waveguide with said fourth branched optical waveguide, one comb-type electrode or a plurality of comb-type electrodes each corresponding to each of said different wavelength components, mounted on said substrate vertically to a propagating direction of said optical wavelength multiplexed signals leaving a specified space apart from said optical waveguide formed by said merger of said third branched optical waveguide with said fourth branched optical waveguide and a voltage applying means to apply a predetermined voltage to each of said comb-type electrodes.

4. The optical wavelength tunable filter according to claim 1, wherein a feedback light intercepting means is mounted to said end face of said branched optical waveguide, out of said first branched optical waveguide, and said second branched waveguide, into which said optical wavelength multiplexed signals each having a different wavelength component are incident.

5. The optical wavelength tunable filter according to claim 1, wherein at least one factor out of widths of tooth electrodes constituting said comb-type electrodes, an amount of clearances between said tooth electrodes and number of said tooth electrodes is determined based on a diffraction wavelength and wherein a refractive index of said optical waveguide is changed, in a manner as if changed by a diffraction grating, by an electric field generated by voltage applied to said voltage applying means used to apply said voltage corresponding to each said wavelength component.

6. The optical wavelength tunable filter according to claim 2, wherein a feedback light intercepting means is mounted to said end face of said branched optical waveguide, out of said first branched optical waveguide, and said second branched waveguide, into which said optical wavelength multiplexed signals each having a different wavelength component are incident.

7. The optical wavelength tunable filter according to claim 2, wherein at least one factor out of a width of each said comb-type electrode, an amount of clearance between said comb-type electrodes and number of said comb-type electrodes is determined based on a diffraction wavelength and wherein a refractive index of said optical waveguide is changed, in a manner as if changed by a diffraction grating, by an electric field generated by voltage applied to said voltage applying means used to apply said voltage corresponding to each said wavelength component.

8. The optical wavelength tunable filter according to claim 3, wherein a feedback light intercepting means is mounted to said end face of said branched optical waveguide, out of said first branched optical waveguide, and said second branched waveguide, into which said optical wavelength multiplexed signals each having a different wavelength component are incident.

9. The optical wavelength tunable filter according to claim 3, wherein at least one factor out of a width of each said comb-type electrode, an amount of clearance between said comb-type electrodes and number of said comb-type electrodes is determined based on a diffraction wavelength and wherein a refractive index of said optical waveguide is changed, in manner as if changed by a diffraction grating, by an electric field generated by voltage applied to said voltage applying means used to apply said voltage corresponding to each said wavelength component.

10. An optical wavelength tunable filter comprising:

an optical waveguide having a first branched optical waveguide and second branched optical waveguide merging into one piece of said optical waveguide through which optical wavelength multiplexed signals, each having a different wavelength component being incident from an end face of said first branched optical waveguide, are propagated;

one comb-type electrode or a plurality of comb-type electrodes each corresponding to each of said different wavelength components, mounted vertically to a propagating direction of said optical wavelength multiplexed signals leaving a specified space apart from said optical waveguide formed by a merger of said branched first branched optical waveguide with said second branched optical waveguide;

an antireflection terminal mounted facing an end face of said optical waveguide formed by the merger of said first branched optical waveguide with said second branched optical waveguide; and a voltage applying circuit to apply a predetermined voltage to each of said comb-type electrodes.

11. An optical wavelength tunable filter comprising:

an optical waveguide formed in parallel to an upper face of a substrate made of a silica based material having a first branched optical waveguide and second branched optical waveguide merging into one, through which optical wavelength multiplexed signals each having a different wavelength component being incident from said first branched optical waveguide are propagated;

one comb-type electrode or a plurality of comb-type electrodes each corresponding to each of said different wavelength components, mounted On said substrate vertically to a propagating direction of said optical wavelength multiplexed signals leaving a specified space apart from said optical waveguide formed by a merger of said first branched optical waveguide with said second branched optical waveguide;

an antireflection terminal mounted facing an end face of said optical waveguide formed by the merger of said first branched optical waveguide with said second branched optical waveguide; and a voltage applying circuit to apply a predetermined voltage to each of said comb-type electrodes.

12. An optical wavelength tunable filter comprising:

one first optical filter or a plurality of first optical filters each having an optical waveguide formed in parallel to an upper face of a substrate made of a silica based material having a first branched optical waveguide and second branched optical waveguide and second branched optical branched waveguide merging into one, through which optical wavelength multiplexed signals each having a different wavelength component being incident from said first branched optical waveguide are propagated and one comb-type electrode or a plurality of comb-type electrodes each corresponding to said different wavelength component, mounted on said substrate vertically to a propagating direction of said optical wavelength multiplexed signals leaving a specified space apart from said optical waveguide formed by said merger of said first branched optical waveguide with said second branched optical waveguide, wherein light emitted from said optical waveguide formed by said merger of said first branched optical waveguide with said second branched optical waveguide disposed in a preceding stage is incident into said first branched optical waveguide disposed in a subsequent stage; and a second optical filter having a branched optical waveguide through which optical wavelength multiplexed signals each having a different wavelength component being incident from a third branched optical waveguide are propagated, which is formed by a merger with a fourth branched optical waveguide into one optical waveguide, to which light emitted from an end face of said optical waveguide formed in parallel to said upper face of said substrate by said merger of said first branched optical waveguide with said second branched optical waveguide disposed in a final stage of said first optical filter is incident, an antireflection terminal mounted facing an end face of said optical waveguide formed by said merger of said third branched optical waveguide with said fourth branched optical waveguide, one combtype electrode or a plurality of comb-type electrodes each corresponding to each of said different wavelength components, mounted on said substrate vertically to a propagating direction of said optical wavelength multiplexed signals leaving a specified space apart from said optical waveguide formed by said merger of said third branched optical waveguide, with said fourth branched optical waveguide and a voltage applying circuit to apply a predetermined voltage to each of said comb-type electrodes.

13. The optical wavelength tunable filter according to claim 1, wherein the at least one comb-type electrode or a plurality of comb-type electrodes is configured to filter both a first and a second wavelength simultaneously.

14. The optical wavelength tunable filter according to claim 1, wherein the first branched optical waveguide comprises an output light branched optical waveguide.

15. The optical wavelength tunable filter according to claim 14, wherein the second branched optical waveguide comprises an input light branched optical waveguide.

16. The optical wavelength tunable filter according to claim 15, wherein the optical waveguide between the merger of said first branched optical waveguide with said second branched optical waveguide propagates input and output light.

17. The optical wavelength tunable filter according to claim 1, wherein said predetermined voltage changes a refractive index of said optical waveguide such that said optical wavelength multiplexed signals input to a first end face of said first branched optical waveguide are output to a second end face of said first branched optical waveguide.

* * * * *